US010810816B1

(12) United States Patent
Kocher et al.

(10) Patent No.: US 10,810,816 B1
(45) Date of Patent: Oct. 20, 2020

(54) INFORMATION-BASED, BIOMETRIC, ASYNCHRONOUS ACCESS CONTROL SYSTEM

(71) Applicants: Robert William Kocher, McLean, VA (US); Douglas Earl Dyer, Herndon, VA (US)

(72) Inventors: Robert William Kocher, McLean, VA (US); Douglas Earl Dyer, Herndon, VA (US)

( * ) Notice: Subject to any disclaimer, the term of this patent is extended or adjusted under 35 U.S.C. 154(b) by 0 days.

(21) Appl. No.: 16/350,247

(22) Filed: Oct. 19, 2018

Related U.S. Application Data

(60) Provisional application No. 62/765,174, filed on Aug. 28, 2018.

(51) Int. Cl.
*G06F 21/32* (2013.01)
*H04L 9/32* (2006.01)
*G07C 9/25* (2020.01)
*G07C 9/23* (2020.01)

(52) U.S. Cl.
CPC .............. *G07C 9/23* (2020.01); *G06F 21/32* (2013.01); *G07C 9/25* (2020.01); *H04L 9/3213* (2013.01); *H04L 9/3231* (2013.01)

(58) Field of Classification Search
CPC ........... G06F 21/32; G06F 21/34; G07C 9/00; H04L 29/06; H04L 63/10; H04L 63/06; H04L 12/28; B60R 25/00
USPC ....................... 340/5.52, 573.1, 517, 521, 5.6
See application file for complete search history.

(56) References Cited

U.S. PATENT DOCUMENTS

| | | | | |
|---|---|---|---|---|
| 6,593,856 B1* | 7/2003 | Madau | ............... | G05B 19/0428 340/12.27 |
| 6,958,676 B1* | 10/2005 | Morgan | ............... | G07B 15/063 340/5.72 |
| 7,898,385 B2* | 3/2011 | Kocher | ..................... | G07C 9/28 340/5.52 |
| 8,174,357 B2* | 5/2012 | Geerlings | .............. | G08C 17/02 340/12.28 |
| 8,620,487 B2* | 12/2013 | Cochran | ................ | G07C 9/257 701/1 |
| 9,003,196 B2* | 4/2015 | Hoyos | ..................... | H04L 63/10 713/186 |
| 9,197,636 B2* | 11/2015 | Varshavsky | ........... | H04L 9/3231 |
| 9,396,598 B2* | 7/2016 | Daniel-Wayman | ......................... | G07C 9/00309 |
| 9,576,412 B2* | 2/2017 | Gudmundsson | .... | G07C 9/00142 |
| 9,626,859 B2* | 4/2017 | Ribas | ...................... | G08C 17/02 |
| 9,646,165 B1* | 5/2017 | Saylor | ................. | G06F 21/6209 |
| 9,942,056 B2* | 4/2018 | Lin | ...................... | H04L 12/2803 |
| 10,083,554 B2* | 9/2018 | Mattern | ................ | G07C 9/257 |
| 10,229,548 B2* | 3/2019 | Daniel-Wayman | ......................... | G07C 9/00103 |
| 2016/0308859 A1* | 10/2016 | Barry | ................. | H04L 63/0861 |

(Continued)

*Primary Examiner* — Nam V Nguyen

(57) ABSTRACT

An information-based access control system for facilities. The control system includes a mobile app and securely connected central server, which is cloud-based. The app collects and transmits multiple biometric and other authentication factors and the facility enabling the server to verify identity and check to ensure the person is authorized to obtain access. If so, the server issues a limited-duration access token, which can be displayed to the facility guards and transmitted to signal lights and electronic gates to obtain access quickly, conveniently, inexpensively, and securely. Because the user can obtain the access token prior to arriving at the gate (asynchronously), throughput increases and traffic won't back up.

9 Claims, 1 Drawing Sheet

(56) References Cited

U.S. PATENT DOCUMENTS

2017/0264608 A1* 9/2017 Moore ................ H04L 63/0861
2017/0324735 A1* 11/2017 Wolf ........................ G06F 21/31
2018/0047227 A1* 2/2018 Beavers ............. G07C 9/00571

* cited by examiner

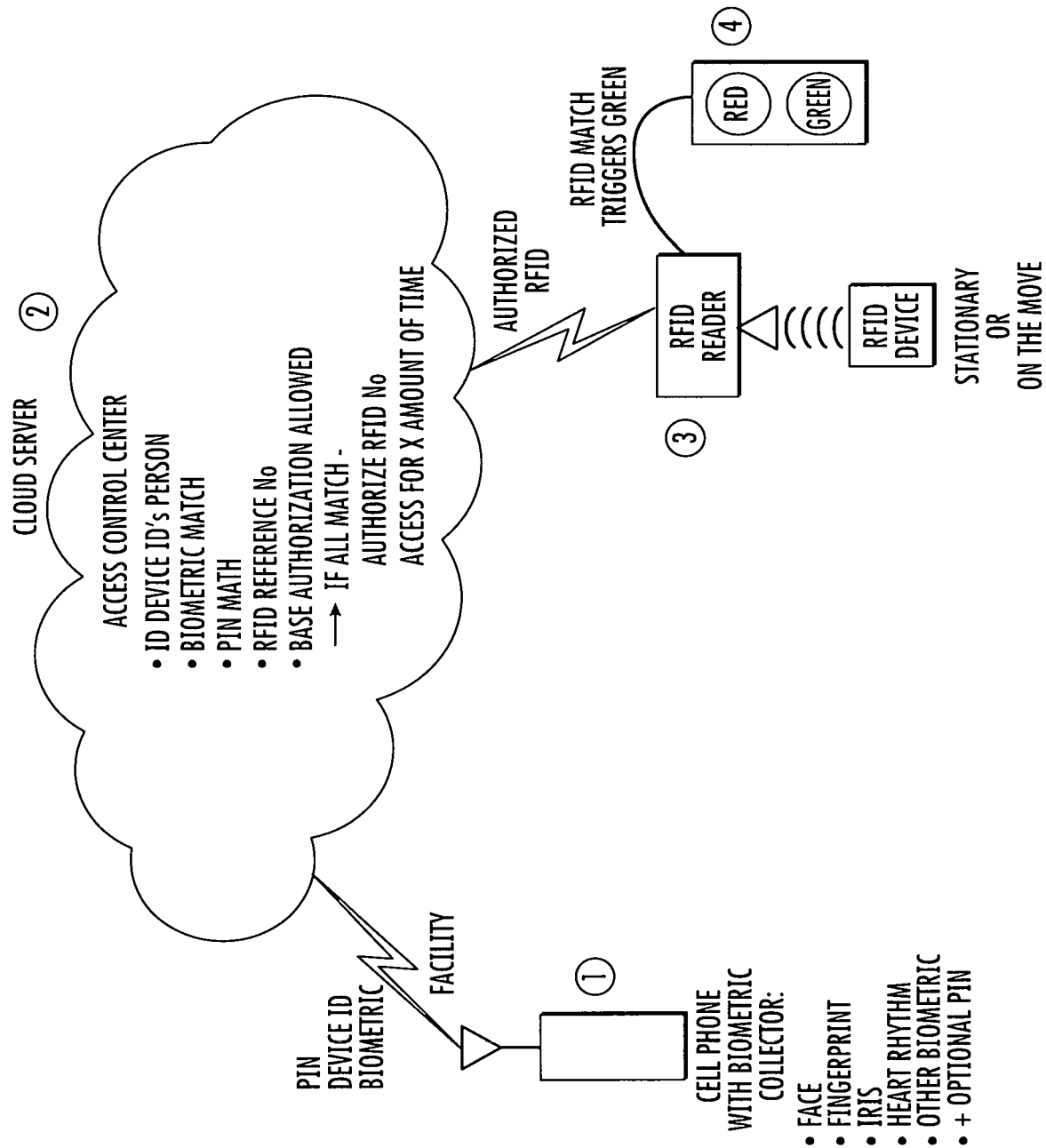

INFORMATION-BASED, BIOMETRIC, ASYNCHRONOUS ACCESS CONTROL SYSTEM

CROSS-REFERENCE TO RELATED APPLICATION

This application claims priority from U.S. Provisional Patent Application No. 62/765,174; titled "Information-based, Biometric, Asynchronous Access Control System;" filed on Aug. 28, 2018; the contents of which are incorporated herein by reference, in its entirety.

FEDERALLY SPONSORED RESEARCH

None

BACKGROUND OF THE INVENTION

The invention relates to the field of providing access to a facility such as a military base, and in particular to an information-based, biometric, asynchronous access control system.

DESCRIPTION OF THE RELATED ART

Traditionally, access control for military bases is provided at a vehicle gate by guards checking ID cards. In operation, the guard checks the ID card of the individual seeking access in order to ensure that the ID card has not expired and is not an obvious forgery. The guard compares the photo on the ID card with the face of the person seeking access. This traditional method suffers from low throughput (less than 6 vehicles per minute, per lane); high costs of manual labor (1 guard per lane), and potential security holes (either through forged documents or stolen documents used by look-alikes). Document security measures and database checks improve some security issues while detracting from other security measures such as the time spent on photo-to-face comparison. Methods of identifying persons based on identifying the vehicle, including license plate recognition, vehicle barcodes, and RFID transponders result in errors from many sources, including failure to correctly identify the vehicle and tenuous association of a vehicle with the person or persons inside. Using such authentication methods to verify are problematic and ill-advised since none of these methods keep information confidential. Identification methods using license plates, vehicle barcodes, and RFID transponders may all be read at a distance and replicated by a determined adversary. Automated readers that scan the ID card are not secure since ID card barcodes may be easily read and replicated on forged documents. Document security measures may all be subverted by a talented counterfeiter with technology similar to the document publisher. Any semi-manual method that detracts from a biometric comparison such as the face-matches-photo determination is detrimental to security. Furthermore, introducing technical equipment for identity verification at a gate is usually very expensive and problematic for many reasons, including the need for environmental protection. Previous solutions also fail to capture information that would improve security, such as duplicate identities and normal access patterns.

An information-based approach similar to ones used for computer systems has the potential to improve security, increase throughput, and lower costs through automated checking, in addition to enhancing convenience for users. Multi-factor authentication is more secure and effective for verifying identity, and biometrics such as face, are particularly convenient for the user and are accurate based on current facial recognition and other biometric algorithms. An adversary hoping to gain access to the facility would need to have known the user's secrets (like PIN), have objects identical to the user's objects (like mobile device and RFID), and appear to be the user (biometrics such as face) are very hard to achieve. Using both a mobile app and the user's own mobile device, and a biometric such as a face photo can be collected and information transferred without great cost of new equipment. Using a central server, enrollment information may be combined with current threat conditions, facility-specified authorized personnel, and analytical algorithms to tailor authentication requirements and access control. By permitting users to request and receive access decisions before arriving at the gate (asynchronously), less time is required to get through the gate, reducing traffic backups and saving everyone time. Security guards can spend more time on physical security threats and exceptions thanks to automated authentication and access control. Fewer security guards may be required, thus reducing labor costs. By avoiding technologies that don't add value such as RFID, license plate readers, and vehicle barcode readers, the system can be relatively inexpensive.

SUMMARY

To improve security, reduce manual effort, human errors, and increase throughput, a smart phone app and central server can work in conjunction to securely verify identity and check that the person is authorized to gain access to the facility; and the user can have a limited-duration access token which is used to gain access. This process can occur prior to arriving at the gate, reducing the time needed at the gate and increasing throughput so traffic does not back up. At the gate, the access token can be displayed or transmitted to satisfy guards or actuate access control equipment such as signal lights and electronic gates. Security is improved because, depending on policy and a desire for user convenience, 1, 2, 3, or more authentication factors may be used to verify identity, and all system information is kept confidential via encryption and other information assurance methods. With automation, the guards have less distracting labor and can better focus on physical security threats and exceptions. Because the central server has a database, it's easy for facilities to limit access to particular people, and all access data are recorded and potentially analyzed to obtain insights and further improve the security of the facility. Because the solution can reuse infrastructure already available, including individual's smart phones and their network connectivity; great benefits are achieved without great cost.

BRIEF DESCRIPTION OF THE DRAWING

The sole FIGURE illustrates an exemplary view of the primary components of the system.

LIST OF THE REFERENCE NUMERALS FOUND IN THE DRAWING

1 Mobile device such as a smart phone
2 Cloud server
3 RFID reader
4 Signal light

DETAILED DESCRIPTION OF THE EXEMPLARY EMBODIMENTS

The components of FIG. 1 include an app running on a mobile device such as a smart phone 1. The smart phone illustrated includes a transponder for transmitting bio-metric information such as an image of a person's face; a fingerprint, a picture of a person's iris; the heart rhythm of the person; other biometrics and an optional pin number. The central server in the cloud 2 includes network connectivity and running programs including a database and access control (software) server. An RFID reader 3 at is provided at the facility gate. The RFID reader 3 communicates with the cloud server and an RFID device. The RFID reader 3 is placed at or near the gate and interacts with vehicles which are stationary or on the move. Access control equipment 4 includes control equipment such as signal lights; and data elements and communication flows with the RFID reader. Information-based access control includes three activities: (1) authenticating, or verifying the identity of the person seeking access, (2) authorizing, which verifies that the identified person should have access according to the facility policy, and (3) acting to communicate and facilitate access through signaling ("green light" if access is granted or "red light" if access is rejected) and also opening/closing electronic gates. Of these, the first activity, authentication, is most difficult. Authentication begins with a claim of identity and includes evidence that can be used to decide whether the claim is true. Ideally, authentication evidence is provided in several different and independent ways, such as something you know (a secret other people do not know such as a computer password or PIN); something you have (an object that belongs only to you); and something you are (a biometric that differentiates you from others). A common example of authentication is when you log in to your computer. Your user name is a claim of identity—the computer account associated with you. Your password (something you know) is one item of evidence that your claim is true. When you log in, your computer checks your password, and if it matches the known password for your account, then the computer allows access. Some computers are set up to require two-factor authentication that includes both a password (something you know) and a time-based on-time-PIN from a smart phone app which shares a secret with a server. Two-factor authentication is better evidence that your claim of identity is correct because the two factors are more-or-less independent of one another. Someone could crack your password but they would not have your phone or access to your time-based on-time-PIN and as a result could not obtain access. For reasons like this, two-factor authentication is regarded as more secure than a single factor like a computer password. It's possible to have three-factor authentication or use even more factors if desired. Humans, being fallible, make mistakes such as forgetting passwords, choosing passwords that are easy to guess, or writing down passwords so that others might find them; losing objects; failing to follow instructions; and rejecting procedures for reasons of inconvenience even when failing to follow instructions increases security risks. A good access control system works despite human failings; takes advantage of new technologies as they become available, and use all available evidence to make good decisions in order to optimize convenience, throughput and security. When conditions change, the security system should be able to adapt quickly; for example, in response to a threat increasing, perhaps the number of required authentication factors increase and authorizations could change.

Traditional access control based on ID card checks provides only a document as authentication evidence, and documents may be forged or stolen. In contrast, information-based access control is based on a central database which is easier to secure and manage in addition to being faster to update; thus improving security in response to changing conditions. The central database includes both authentication and authorization information. If desired, the central database can also automate access decisions and provide control signals to signal lights, gates and other access control equipment. Of course, a network is required to connect the database to these field elements, but networks are now ubiquitous. For example, any security gate lacking network connectivity may be connected via a cellular hot spot for about $30/month, and the bandwidth provided is sufficient because control information is quite compact. An alternative to a network is to distribute the database through the use of Distributed Access Cards (DAC). The CAC is one example of a security card for a distributed database. A CAC satisfies the requirement for two-factor authentication: something the user knows combined with something the user has. But the economics favor centralization and dependence on a network.

Authorization is based on the role of the person identified in authentication. Authorization is a policy that may be changed according to the dynamic situation. Once identity is authenticated, making access decisions based on authorization is rather trivial and will be correct so long as policy is kept up-to-date.

After authentication and authorization checks, there is sufficient information to decide and act upon. If a person successfully authenticates and has adequate authority, then the decision is to grant access. In this case, the system must support communication necessary to act in support of access. Typically, this includes notifying the guard as well as the person seeking access and providing control signals to open a gate. If there is good synchronization, then the system might provide these actions directly. Alternatively, the system can support asynchronous service by providing the person requesting access with a token that can be used to inform the guard and the local access control equipment for appropriate response.

An information-based access control system that operates synchronously works in this way. A person wishing access has to send a claim of identity with one or more authentication factors that provide evidence that the identity is correct. In addition, the person includes the particular facility (facilities restrict access to particular people). The system considers the information, comparing it with known information in a database, then provides an access determination to security personnel, perhaps sends signals to automated access control equipment such as signal lights and electronic gates, and may also provide the access determination back to the person seeking access. All communications and devices are secure and provide basic information assurance. Because the system is operating synchronously, all these actions must occur at the gate as each vehicle approaches; no vehicle can begin the process before the vehicle in front completes the process and is admitted through the gate (or rejected).

Practically, the system should operate asynchronously since there are often multiple vehicles entering the gate at once and because it saves time to be approved for access before a user arrives at a gate. This changes the design only slightly. In the "green light" case, the system issues an access token to the person seeking access and also to the security personnel and access control equipment. Because tokens are supplied asynchronously, the security personnel and access control equipment will, in general, have a set of expected tokens. When a person seeking access arrives at the gate, they present their token, and if it is in the set of expected tokens, access is provided. That particular token is removed from the set shortly afterwards to prevent covert reuse.

One benefit of this design is that the person seeking access knows immediately if they have access and can correct a problem (e.g. via a new access request) or be prepared to request a secondary security protocol.

There are many ways to provide information and receive an access token. The simplest, most reliable, inexpensive, and most convenient way is to use an app on an Android or iOS smart phone. According to the Pew Research Center, as of 2018, more than 90% of 18-49-year-olds in the US have a smart phone, a figure that has been increasing every year. Smart phones are essentially computers with many built-in peripherals (e.g. GPS, camera), a USB connector for attaching external peripherals (e.g. fingerprint or iris scanner or other biometric device), and near-continuous connectivity to a digital network. They protect data by securing both data at rest and data in transit. It's easy for a user to download an app, set it up during enrollment, and use it to securely authenticate and receive an access token.

One method of presenting a user's access token is for the server to send something that can be quickly and reliably sensed along with the access token to the facility. For example, if the user's vehicle has an RFID transponder or tag, then the associated RFID code can be sent by the server along with the user's access token. In the asynchronous case, that means the facility will have a dynamic set of access tokens with associated RFID codes. Any vehicle approaching with one of the RFID codes has a user who is should get access. Any vehicle with no RFID or an RFID that does not match any in the set should not receive access. After a vehicle is admitted, the access token associated with its RFID code is removed from the set. Note that the RFID is not being used as an authentication factor—it should not serve in this capacity since its code can be read and replicated by anyone. Instead, it is used, during the limited duration when an access token is valid, to recognize someone who should get access. If some other person tries to use a duplicate RFID to gain access, the problem is very quickly made obvious since two vehicles cannot gain access using one access token.

The operation of an exemplary embodiment is to enroll and set up the smart phone app. Assuming network connectivity, the user enters their identity in the form of a Unique ID Number, presses a button to take a face photo or other biometric (this step may be repeated as needed), presses a button to take a photo of their issued ID card (this step may be repeated as needed), enters a unique personal identification number (PIN) for access and also a PIN for a distress code (to be used to summon help in the case of coercion), then presses a button to enroll. Enrolling securely sends the Unique ID Number, face photo or other biometric, and ID card photo, and PINs to a server which takes several steps to verify the user's identity. The system obtains the ID card photos from a database and compares the face photo submitted using a facial recognition algorithm and a policy-established similarity threshold (or, similarly for an alternative biometric). If there is sufficient uncertainty in the facial similarity, the face photos are provided to a trained facial examiner for determination (in which case, the user must wait until the determination is made; and similarly for an alternative biometric). The system also analyzes the ID card photo for any signs of forgery.

If the system's analysis verifies the user's identity and ID card, the system responds with a unique secret that it now associates with that user by saving it on a server. The user's app saves the shared secret in an encrypted file along with the user's DOD ID Number. The shared secret will be used, in the future, to create a time-based one-time PIN (TOTP) to provide one factor of authentication (something you have, namely, your phone). This is analogous to Google Authenticator and similar apps used for two-factor authentication in computing. Enrollment is now complete (estimated time: ~2 minutes).

To use the app for base access, the user starts the app when their vehicle is stopped near the gate. The app may be started normally or using voice commands ("OK Google, open InSec"). The user presses a button in the app and then looks at the phone's front camera. The app takes a face photo (something you are), then sends the access request over a secure HTTPS connection to the server. The request includes DOD ID Number, TOTP, face photo, and the location of the facility. The server verifies the TOTP (user's phone) and face photo (user's face, via a facial recognition algorithm) for the DOD ID Number, and checks the user's authorization for the facility. On success, the server returns an access token which is a unique secret also provided to the security personnel and equipment at the gate. This process takes 2-3 seconds. Upon arriving at the gate, the user presents the token to gain access. One convenient method of presenting the token is in the form of a QR code which can be read very quickly by a mounted or hand-held barcode reader or a guard's own phone. Another convenient method, provide the user's vehicle has an RFID tag and the facility gate has an RFID reader, is to have the server send the access token along with user's RFID code so that the user can be automatically detected at the gate and provided access. In any event, the access token is valid for only a short time such as 5-15 minutes, enabling the user to safely obtain an access token prior to arriving at the gate; which reducing the time required at the gate for authentication and authorization checks. After a successful request, the smart phone app displays the QR code representing the access token for a certain limited amount of time after which it disappears. When presented, the QR code is interpreted or RFID code detected, and the resulting token is compared with a set of expected tokens. If not found, access is denied and the user is shunted to a secondary protocol. If access is granted the person is granted access and that token is then removed from the set shortly afterwards, to prevent nefarious reuse.

Not shown in the diagram but understood to exist are software components, the actual hardware server in the cloud and a local computer at the facility gate which reads the RFID codes from the RFID reader and controls the access control equipment, which might include an electronic gate in addition to signal lights like a stoplight. The cell phone is a smart phone with built in peripherals such as a camera and GPS and includes a USB interface to support connection to external devices such as other biometric readers for collecting biometrics other than face such as fingerprint, iris, heart rhythm, or other biometric. Software in a smart phone app enables initial enrollment and day-to-day access requests and access token receipt. The cloud server includes one or more biometric recognizers such as facial recognition in addition to system software. The RFID reader is connected to a local computer at the facility which is able to receive access tokens and associated RFID codes from the server. A signal light is also connected to the local facility computer which controls it.

The information-based, biometric, asynchronous access control system described greatly improves security, convenience, and throughput over current methods based on ID card checks. Because it is based on ubiquitous mobile devices, it achieves these advantages at low cost. The system described is flexible and adaptable so that it can take advantage of new technologies as they arise and change the authentication factors and authorizations as the threat conditions change at the facility.

It should be understood that the foregoing relates only to preferred embodiments of the present invention and that numerous modifications or alterations may be made therein without departing from the spirit and scope of the invention as set forth in the appended claims. Such alternate embodiments are considered to be encompassed within the spirit and scope of the present invention. Accordingly, the scope of the present invention is described by the appended claims and supported by the foregoing description.

The invention claimed is:

1. An asynchronous method for allowing physical or logical access to a facility or venue, the method comprising of the following steps:
   collecting a biometric of a person requesting access;
   collecting an identification code sent from a radio frequency identification device of a vehicle of the person requesting access to the facility or venue, while the vehicle is approaching a gate of the facility or venue;
   the collection of the identification code occurs at a radio frequency identification device reader located at or near a gate of the facility or venue that the person is requesting access to;
   sending a user's encrypted access request including multiple authentication factors including the biometric based on a shared secret to the facility or venue being access;
   verifying a person's identity using said multiple authentication factors received using algorithmic comparison of said shared secret and biometric algorithmic comparison to compare the biometric and a known biometric from enrollment or other source;
   further verifying the person's identity from verification of the an authenticity of the identification code;
   checking whether the identified person is authorized access to said facility;
   in response to the person's identity being valid and the identified person is authorized access, providing the identified person with a limited duration secure access token which is valid for entry to said facility for a certain time period;
   communicating the limited duration secure access token to said facility to verify said limited duration secure access token to the guard;
   providing control signals necessary to actuate access control equipment including signal lights or the gate at said facility in order to enable physical access if the limited duration secure access token is in a set of expected tokens; and
   wherein the identification code is only accepted during a short period of time that the limited duration access token is in effect and the identification code and biometric are verified for access;
   wherein the identified person seeking access is authorized to enter the facility while on the move and prior to reaching the gate, so as to lessen the time the identified person seeking access has to spend at the gate.

2. The method of claim 1, wherein the biometric is one or more of a facial Image, fingerprint, an image of the person's iris, the person's heart rhythm.

3. The method of claim 1, further including an additional personal identification number for further authentication of the person.

4. The method of claim 1, wherein the multiple authentication factors are stored in a database in an internet cloud.

5. The method of claim 4, wherein the database is a biometric database.

6. The method of claim 5, wherein the biometric database includes biometric matching circuitry.

7. The method of claim 1, wherein the signal lights are configured to be located on or near an entry gate.

8. The method of claim 2, wherein an access location is based on information from a global positioning system device.

9. The method of claim 1, wherein biographic information is obtained from a person seeking access in addition to biometric information.

* * * * *